United States Patent
Sei et al.

(10) Patent No.: US 8,991,934 B2
(45) Date of Patent: Mar. 31, 2015

(54) VEHICLE SEAT

(75) Inventors: Kousuke Sei, Toyota (JP); Keisuke Yamamoto, Toyota (JP); Yukinori Sugiura, Nissin (JP); Takanori Kinoshita, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 245 days.

(21) Appl. No.: 13/559,831

(22) Filed: Jul. 27, 2012

(65) Prior Publication Data
US 2013/0033084 A1 Feb. 7, 2013

(30) Foreign Application Priority Data
Aug. 4, 2011 (JP) ................................. 2011-170922

(51) Int. Cl.
*A47C 7/24* (2006.01)
*A47C 7/02* (2006.01)
*B60N 2/58* (2006.01)

(52) U.S. Cl.
CPC .................................. *B60N 2/5825* (2013.01)
USPC .................................. 297/452.6; 297/452.59

(58) Field of Classification Search
USPC .................. 297/452.6, 452.62, 218.2, 452.59
See application file for complete search history.

(56) References Cited

U.S. PATENT DOCUMENTS

| | | | | |
|---|---|---|---|---|
| 3,630,572 A | * | 12/1971 | Homier | 297/452.6 |
| 3,632,164 A | * | 1/1972 | Radke | 297/452.6 |
| 3,649,974 A | * | 3/1972 | Baruth et al. | 5/402 |
| 3,961,823 A | * | 6/1976 | Caudill, Jr. | 297/452.6 |
| 4,317,591 A | * | 3/1982 | Ramsey | 297/452.6 |
| 4,558,905 A | * | 12/1985 | Natori | 297/452.6 |
| 4,579,389 A | * | 4/1986 | Shimbori et al. | 297/452.6 |
| 4,718,718 A | * | 1/1988 | Maruyama | 297/180.12 |
| 4,865,383 A | | 9/1989 | Sbaragli et al. | |
| 5,641,204 A | * | 6/1997 | Lhuissier et al. | 297/452.6 |
| 6,003,939 A | * | 12/1999 | Nakai et al. | 297/216.13 |
| 6,592,181 B2 | * | 7/2003 | Stiller et al. | 297/218.2 |

(Continued)

FOREIGN PATENT DOCUMENTS

| | | | | |
|---|---|---|---|---|
| CN | 101583299 | | 11/2009 | |
| DE | 4219891 | | 12/1993 | |
| EP | 280148 A1 | * | 8/1988 | ............. A47C 31/02 |

(Continued)

OTHER PUBLICATIONS

U.S. Appl. No. 13/486,307 to Sakae Okuyama et al., which was filed Jun. 1, 2012.

(Continued)

*Primary Examiner* — David R Dunn
*Assistant Examiner* — Tania Abraham
(74) *Attorney, Agent, or Firm* — Greenblum & Bernstein, P.L.C.

(57) ABSTRACT

An engaging member is arranged at a first portion of part of an upholstery member, the first portion facing a first section, and the engaging member is fixed to an engaged member in a second groove. A second portion of the part of the upholstery member, the portion facing the second section, is arranged in the second section. One end-side portion of the engaging member is extended into the second section. In the direction in which the second groove extends, the length of an extended portion that is formed at the one end-side portion of the engaging member and that is extended into the second section is shorter than the length of a portion of the second section excluding the other portion corresponding to the extended portion.

7 Claims, 5 Drawing Sheets

(56) References Cited

U.S. PATENT DOCUMENTS

| | | |
|---|---|---|
| 7,017,997 B2 * | 3/2006 | Takezawa et al. ......... 297/452.6 |
| 7,703,855 B1 * | 4/2010 | Kalinowski ................ 297/452.6 |
| 7,946,649 B2 * | 5/2011 | Galbreath et al. ......... 297/218.1 |
| 2002/0117882 A1 | 8/2002 | Takezawa |
| 2005/0173964 A1 | 8/2005 | Takezawa et al. |

FOREIGN PATENT DOCUMENTS

JP      2004-41252      2/2004

OTHER PUBLICATIONS

Chinese Office action dated Aug. 4, 2014, along with an English-language translation thereof.

* cited by examiner

VEHICLE SEAT

INCORPORATION BY REFERENCE

The disclosure of Japanese Patent Application No. 2011-170922 filed on Aug. 4, 2011 including the specification, drawings and abstract is incorporated herein by reference in its entirety.

BACKGROUND OF THE INVENTION

1. Field of the Invention

The invention relates to a vehicle seat that has an upholstery member, a cushion member, and grooves of the cushion member, into which part of the upholstery member is tucked to be fixed.

2. Description of Related Art

As this type of vehicle seat, a vehicle seat that includes a seat cushion and a seatback is known (see Japanese Patent Application Publication No. 2004-41252 (JP 2004-41252 A)). The seat cushion has a cushion member that elastically supports an occupant, and an upholstery member that covers the cushion member. The cushion member is a generally rectangular member that forms the outer shape of the seat cushion, and has a first groove, a pair of second grooves, and a plurality of wiry engaged members. The first groove is a recess that extends in the width direction of the seat cushion, and is formed at substantially the center of a seating-side portion of the cushion member. The second grooves are recesses that extend in the front-rear direction of the seat cushion and meet the first groove. The second grooves are formed in respective side portions of the seating-side portion of the cushion member. The engaged members are disposed under the bottoms of the first groove and the second grooves, and partially exposed at recessed portions formed in the bottoms within the grooves.

The upholstery member is made of fabric or leather, and is a bag-shaped member. The upholstery member has a plurality of wiry engaging members. The engaging members are attached to the back side of the upholstery member, and arranged to face the grooves. In related art, the engaging members that face the second groove are attached to the upholstery member such that the engaging members are separated from each other near the first groove. In addition, in related art, when the seating-side portion of the cushion member is covered with the upholstery member, part of the upholstery member is tucked into the grooves. At this time, the engaging members are engaged with the engaged members. As a result, the part of the upholstery member is tucked into the grooves and fixed in the grooves.

In the above-described seat configuration, in order to give presentable appearance to the seat, the upholstery member may be tucked into only part of each second groove to be fixed. For example, the upholstery member may be tucked into one-side portion of each second groove (a portion that extends from a point, at which the second groove meets the first groove, toward one side in the front-rear direction of the cushion member), and fixed in the one-side portion. On the other hand, the upholstery member is arranged in the other-side portion of each second groove (a portion that extends from the point, at which the second groove meets the first groove, toward the other side in the front-rear direction of the cushion member) so as not to be fixed.

In the configuration according to related art, the engaging members face the second groove such that the engaging members are separated from each other near the first groove. Due to this configuration, the upholstery member may fail to be tightly tucked into each second groove at a portion at which the engaging members are separated from each other (a portion at which the grooves meet each other), for example. This may detract the appearance of the seat. Instead of this configuration, longer engaging members may be employed and arranged to face the second grooves over the entire length of second grooves. With this configuration, however, the engaging members are fitted also in the other-side portions of the second grooves, into which the upholstery member is not tucked. Therefore, this configuration has a relatively large number of unnecessary portions (this configuration has a relatively low utilization efficiency).

The invention is made in light of the above-described circumstances, and it is an object of the invention to fix part of an upholstery member to a cushion member with presentable appearance of the seat maintained while effectively utilizing a seat configuration.

SUMMARY OF THE INVENTION

A vehicle seat according to an aspect of the invention includes a seat cushion and a seatback. Each of the seat cushion and the seatback includes a cushion member, a first groove, a second groove, and an upholstery member. The cushion member is a member that forms an outer shape of the seat and that elastically supports the occupant. The first groove is formed in a seating-side portion of the cushion member, and extends in the width direction of the seat. The second groove is formed in the seating-side portion of the cushion member, and meets the first groove. The upholstery member covers the cushion member In the aspect of the invention, when the cushion member is covered with the upholstery member, at least a portion of part of the upholstery member is tucked into and fixed in the first groove and the second groove. The second groove has a first section that extends from a meeting point, at which the second groove meets the first groove, toward one side of the cushion member, and a second section that extends from the meeting point toward the other side of the cushion member. The part of the upholstery member is tucked into and fixed in the first section. In this type of seat configuration, it is desirable to fix part of the upholstery member to the cushion member with presentable appearance of the seat maintained, while effectively utilizing the seat configuration.

Therefore, according to the aspect of the invention, an engaging member is arranged at a portion of the part of the upholstery member, the portion facing the first section, and the engaging member is fixed to an engaged member arranged in the second groove. Further, a portion of the part of the upholstery member, the portion facing the second section, is arranged in the second section. In addition, one end-side portion of the engaging member is extended into the second section. In the direction in which the second groove extends, the length of an extended portion that is formed at the one end-side portion of the engaging member and that is extended into the second section is shorter than the length of a portion (a portion into which the upholstery member is not tucked) of the second section excluding the other portion corresponding to the extended portion. According to the aspect of the invention, because the engaging member is extended into the second section, it is possible to suppress a decrease in a force for tucking the upholstery member at the meeting point. In other words, the engaging member is arranged to cross the meeting point at which the first groove and the second groove meet each other. In addition, because the length of the extended portion of the engaging member is set short, it is possible to achieve the seat configuration with less unnecessary portions.

The configuration of the vehicle seat according to the aspect may be applied to the seat cushion. The first section may extend from the meeting point, at which the second groove meets the first groove, toward the one side of the cushion member, at which the seatback is arranged. Because a portion of the upholstery member is fixed to the cushion member at the first section (the section that is subjected to pressure from the seated occupant) near the seatback, the upholstery member is attached to the cushion member more stably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
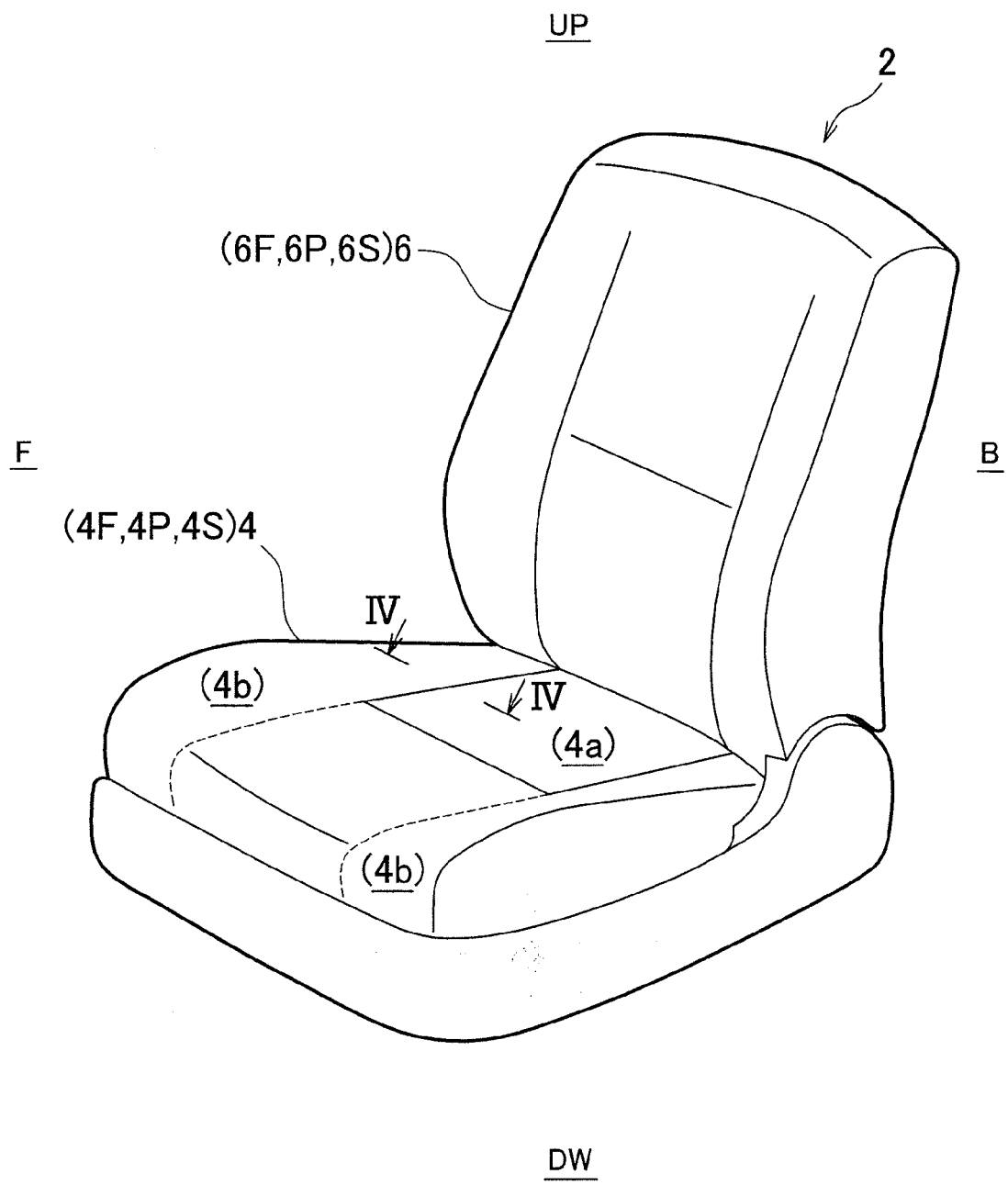
FIG. 1 is a perspective view of a vehicle seat.

Hereafter, embodiments of the invention will be described with reference to FIG. 1 to FIG. 4. In the drawings, a reference sign F denotes the front side of a vehicle seat, a reference sign B denotes the rear side of the vehicle seat, a reference sign UP denotes the upper side of the vehicle seat, and a reference sign DW denotes the lower side of the vehicle seat. A vehicle seat 2 in FIG. 1 includes seat components (a seat cushion 4 and a seatback 6). The seatback 6 is tiltably coupled to a rear portion of the seat cushion 4. The seat components include frame members (4F, 6F) that serve as seat frameworks, cushion members (4P, 6P) that form the seat outer shapes, and upholstery members (4S, 6S) that cover the cushion members (4P, 6P).

The seat cushion 4 has the frame member 4F, the cushion member 4P, the upholstery member 4S, a plurality of grooves (a first groove 21 and a pair of second grooves 22), and an engagement structure (41 to 46) (see FIG. 1 to FIG. 4. Each member will be described later in details). In a present embodiment, the cushion member 4P is arranged on the frame member 4F, and a seating-side portion of the cushion member 4P is covered with the upholstery member 4S. Part (18a, 18b) of the upholstery member 4S are tucked into and fixed in the grooves 21, 22 formed in the cushion member 4P. In the present embodiment, in order to give presentable appearance to the seat cushion 4, the part (18b) of the upholstery member 4S is tucked into and fixed in only part of each second groove 22. In this type of seat configuration, it is desirable to fix the part (18b) of the upholstery member 4S to the cushion member 4P with presentable appearance of the seat cushion 4 maintained, while effectively utilizing the seat configuration. The later-described configurations according to the present embodiment make it possible to fix the part (18b) of the upholstery member 4S to the cushion member 4P with presentable appearance of the seat cushion 4 maintained while effectively utilizing the seat configuration. The configurations will be described below in details.

Figure 2A:
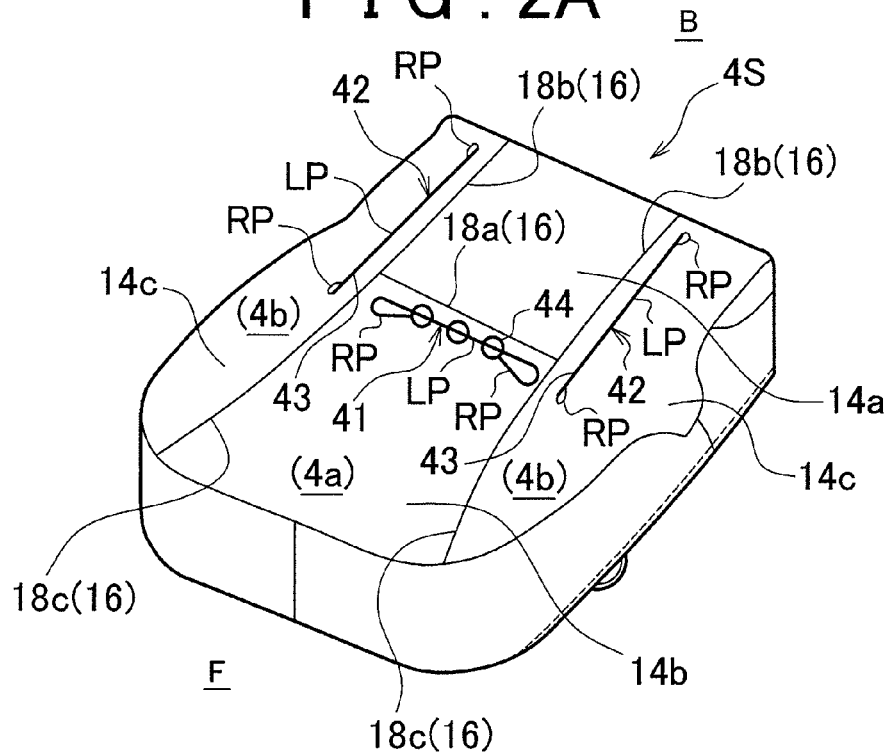
FIG. 2A is a perspective view of an upholstery member according to an embodiment of the invention.
Figure 4:
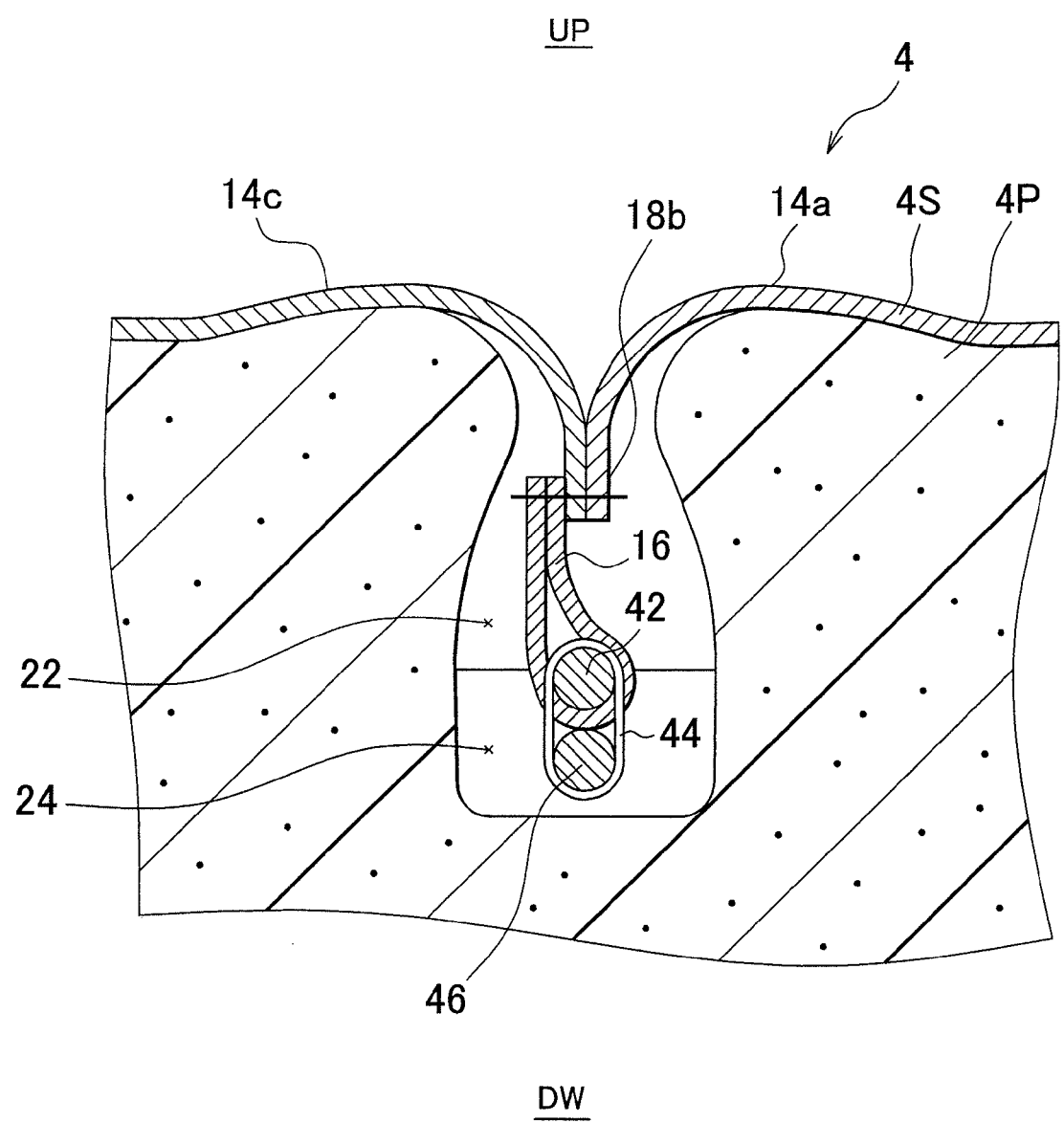
FIG. 4 is a sectional view taken along the line IV-IV in FIG. 1.
Figure 5:
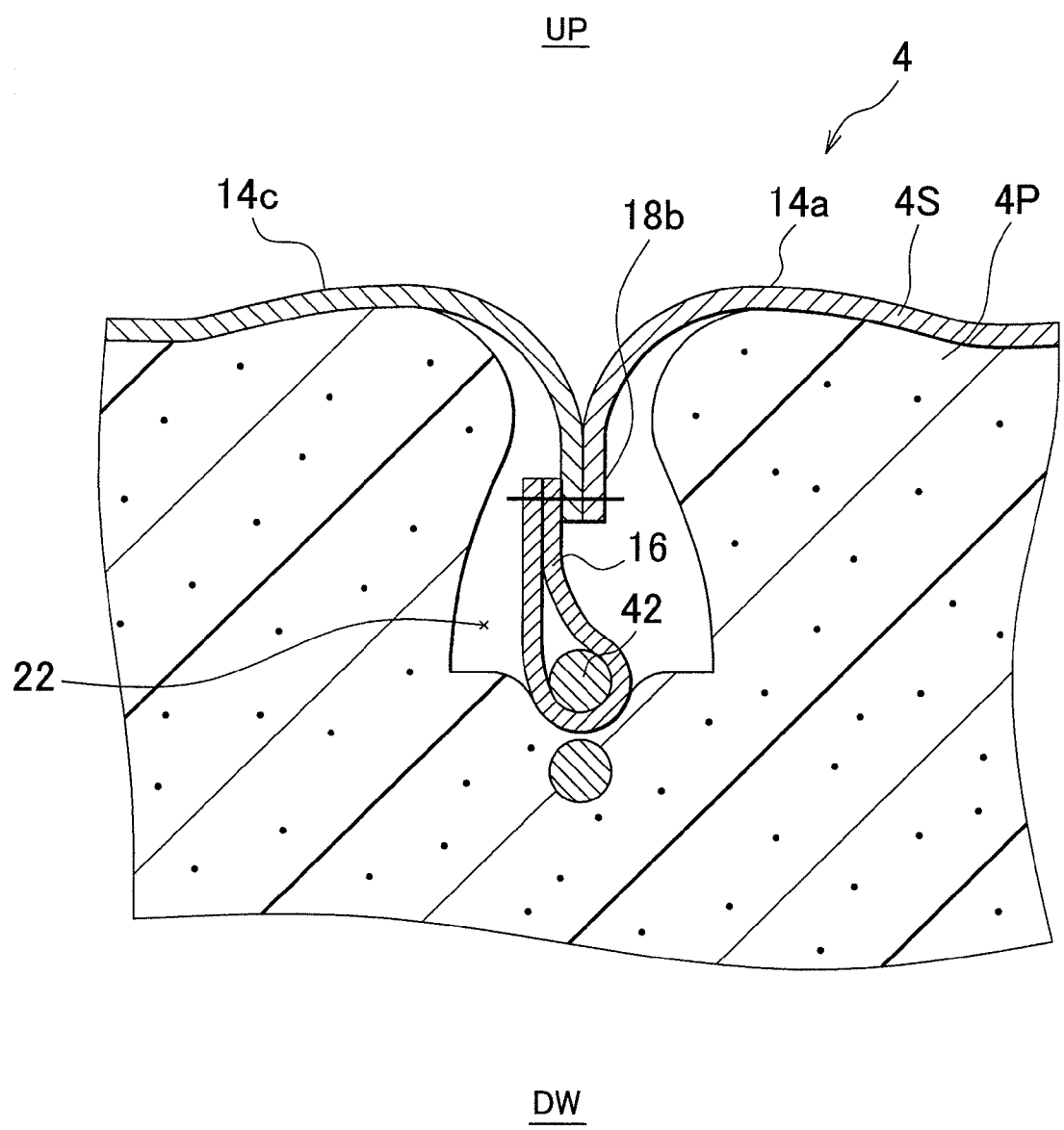
FIG. 5 is a sectional view taken along the line V-V in FIG. 3 (In the case that the second engaging member is arranged to face the first section).

The upholstery member 4S has a plurality of upholstery pieces (a first piece 14a, a second piece 14b, and a pair of third pieces 14c) and a plurality of sheet members 16 (see FIG. 2A and FIG. 4). The first piece 14a and the second piece 14b cover a seating portion 4a (a center portion of the cushion member 4P). The first piece 14a covers a rear portion of the seating portion 4a, and the second piece 14b covers a front portion of the seating portion 4a. The third pieces 14c cover a pair of thigh bolsters 4b that are side portions of the cushion member 4P. The sheet members 16 are made of fabric or leather, and are band-like members arranged along part (a plurality of sewn portions 18a to 18c described later) of the upholstery member 4S.

In the present embodiment, the upholstery pieces 14a to 14c are put together and the sewn together into a bag shape. At this time, end portions of the adjacent piece are bent inward, put together such that the surfaces thereof contact each other, and sewn together. As a result, the part (a first sewn portion 18a, a second sewn portion 18b, and third sewn portions 18c) of the upholstery member 4S is formed. A front end of the first piece 14a and a rear end of the second piece 14b are bent inward, and put together such that the surfaces thereof contact each other to form the first sewn portion 18a. The first sewn portion 18a extends in the width direction of the seat cushion, and is arranged to face the first groove 21. Lateral ends of the first piece 14a and one lateral ends of the third pieces 14c are bent inward and put together such that the surfaces thereof contact each other to form the second sewn portions 18b. The second sewn portions 18b extend in the front-rear direction of the seat cushion, and are arranged to face the second grooves 22 (first sections 22f, described later). That is, the second sewn portions 18b are included in the above-described part of the upholstery member 4S, and face the first sections 22f. In the present embodiment, the second sewn portion 18b functions as a first portion in accordance with the invention. Lateral ends of the second piece 14b and one lateral ends of the third pieces 14c are bent inward and put together such that the surfaces thereof contact each other to form the third sewn portions 18c. The third sewn portions 18c extend in the front-rear direction of the seat cushion and are arranged to face the second grooves 22 (second sections 22s, described later). That is, the third sewn portions 18c are included in the above-described part of the upholstery member 4S, and face the second sections 22s. In the present embodiment, the third sewn portion 18c functions as a second portion in accordance with the invention.

Figure 3:
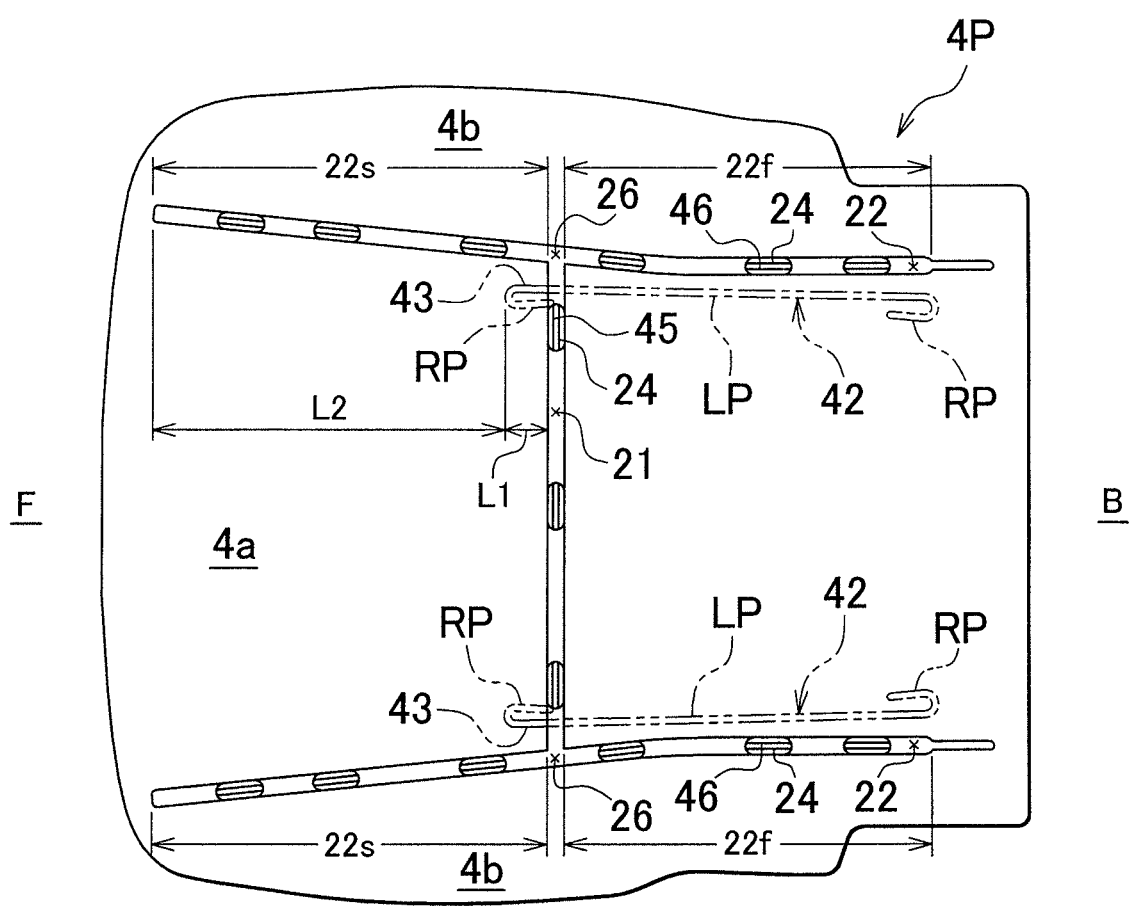
FIG. 3 is a top view of a cushion member.

The cushion member 4P has the seating portion 4a, the thigh bolsters 4b, and the grooves 21, 22 (a plurality of recessed portions 24) (see FIGS. 3 and 4). The seating portion 4a is a flat portion (generally rectangular as viewed from above) on which an occupant is seated, and is located at the center of the seat cushion 4. The thigh bolsters 4b are bulge portions located in respective side portions of the seat cushion 4, and support the lateral side portions of the occupant when a vehicle goes round a curve. The material of the cushion member 4P is not particularly limited. However, it is desirable to use elastic resin. For example, polyurethane foam having a density of 10 kg/m$^3$ to 60 kg/m$^3$ may be used.

The grooves (the first groove 21 and the second grooves 22) are linear recesses, and are formed in a seating-side portion (a top face) of the cushion member 4P. The first groove 21 is a recess that extends in the width direction of the seat cushion. The second grooves 22 are recesses that extend (from one side to the other side of the cushion member 4P) in the front-rear direction of the seat cushion. Each second groove 22 has the first section 22*f* and the second section 22*s* that will be described later. The recessed portions 24 are formed in the bottom faces of the grooves 21, 22, and are arranged within the grooves 21, 22 at predetermined intervals. In FIG. 3, for the sake of convenience, the reference numerals are assigned to only some of the recessed portions 24.

In the present embodiment, the first groove 21 is formed so as to cross the center of the seating portion 4*a* (see FIG. 3). The second grooves 22 are each formed between the seating portion 4*a* and a corresponding one of the thigh bolsters 4*b*, and meets (is communicated with) the first groove 21 at its middle portion. Each second groove 22 is divided into the first section 22*f* and the second section 22*s* by the first groove 21. The first section 22*f* extends from a meeting point 26, at which the second groove 22 meets the first groove 21, toward the rear (the one side) of the cushion member 4P, at which the seatback 6 is arranged. The second section 22*s* extends from the meeting point 26 toward the front (the other side) of the cushion member 4P.

The engagement structure is used to fix the part of the upholstery member (the sewn portions 18*a*, 18*b*) in the grooves 21, 22 (see FIG. 2A, FIG. 3 and FIG. 4). The engagement structure according to the present embodiment has a plurality of engaging members 41, 42, a plurality of engaged members 45, 46, and a plurality of ring members 44. Each ring member 44 is formed by clamping a generally C-shaped member into a substantially closed-ring shape (generally O-shape) with the use of, for example, a tool. The engaged members (the first engaged member 45 and a pair of the second engaged members 46) are long rod-shaped members, and are disposed under the bottoms of the corresponding grooves (see FIG. 3). In the present embodiment, the first engaged member 45 is disposed under the bottom of the first groove 21, and is partially exposed at the recessed portions 24. The second engaged members 46 are disposed under the bottoms of the second grooves 22, and are partially exposed at the recessed portions 24.

The engaging members (the first engaging member 41 and the second engaging members 42) are wiry members, and are attached to the back side of the upholstery member 4S (see FIG. 2A). The first engaging member 41 is a (relatively long) wiry member, and the size of the first engaging member 41 is set such that the first engaging member 41 fits within the first groove 21 without protruding into the second grooves 22. The second engaging members 42 are (relatively short) wiry members. Each of the first engaging member 41 and the second engaging members 42 according to the present embodiment has an engaging portion LP and turn-back portions RP. Each engaging portion LP extends linearly, and is located to face a corresponding one of the grooves (a corresponding one of the engaged members). The turn-back portions RP are formed by turning back both ends of each engaging member (into a generally transversely-oriented J-shape).

As shown in FIG. 2A, FIG. 3, and FIG. 4, the engaging member 41 and the engaging members 42 are arranged at the sewn portion 18*a* and the sewn portions 18*b*, respectively. In the present embodiment, the looped-back sheet member 16 is attached to the first sewn portion 18*a*, and then the first engaging member 41 is passed through the sheet member 16 and arranged to face the first groove 21. In addition, the looped-back sheet members 16 are attached to the second sewn portions 18*b*, and then the second engaging members 42 are passed through the sheet members 16 and arranged to face the second grooves 22 (the first sections 22*f*). At this time, in the present embodiment, one end-side portion of each second engaging member 42 is extended into the second section 22*s* (an extended portion 43 is formed). The extended portion 43 (a portion at the one end-side portion of the second engaging member 42, which is extended into the second section 22*s*) is formed, and the second engaging member 42 is arranged such that the one end-side portion thereof crosses the meeting point 26 at which the first groove 21 and the second groove 22 meet each other. It is desirable that, at the one end-side portion of the second engaging member 42, the engaging portion LP crosses the meeting point 26. In addition, in the direction in which the second groove 22 extends, the length L1 of the extended portion 43 is set shorter than the length L2 of the remaining portion of the second section 22*s* (into which the upholstery member 4S is not tucked), that is, a portion of the second section 22*s* excluding the other portion corresponding to the extended portion 43 (see FIG. 3).

As shown in FIG. 1 to FIG. 4, when the cushion member 4P is covered with the upholstery member 4S, the part of the upholstery member (18*a*, 18*b*) is tucked into and fixed at the grooves 21, 22. In the present embodiment, the first sewn portion 18*a* is tucked into and fixed in the first groove 21. When the first sewn portion 18*a* is tucked into the first groove 21, the first engaging member 41 and the first engaged member 45 are passed through the ring members 44, and then the ring members 44 are clamped into a closed ring shape (in FIG. 2, for the sake of convenience, the reference numeral is assigned to only one of the ring members 44).

In addition, each second sewn portion 18*b* is tucked into and fixed in the corresponding first section 22*f*, and each third sewn portion 18*c* is arranged in the corresponding second section 22*s* without being fixed. In the present embodiment, when the second sewn portion 18*b* is tucked into the first section 22*f*, the second engaging member 42 and the second engaged member 46 are passed through the ring members 44 and then the ring members 44 are clamped into a closed ring shape (see FIG. 3 and FIG. 4). At this time, the one end-side portion of the second engaging member 42 (the portion that crosses the meeting point 26) is engaged with the second engaged member 46, together with the remaining portion (the portion that faces the first section 22*f*) of the second engaging member 42. Therefore, a portion of the upholstery member 4S, which faces the meeting point 26, is tucked into and fixed in the second groove 22.

As described above, in the present embodiment, the one end-side portion of the second engaging member 42 is arranged to cross the meeting point 26, at which the first groove 21 and the second groove 22 meet each other. In addition, the one end-side portion of the second engaging member 42, along with the other end-side portion of the second engaging member 42, is drawn into and fixed in the second groove 22. In this way, it is possible to suppress a decrease in a force for tucking the upholstery member 4S into the second groove 22 at the meeting point 26. In the present embodiment, because the length L1 of the extended portion 43 is set to the smallest possible value, it is possible to achieve a seat configuration with less unnecessary portions. In addition, with the formation of the relatively short extended portion 43, the one end-side portion of the second engaging member 42 reliably crosses the meeting point 26 (the seat configuration is effectively utilized). Furthermore, in the present embodiment, the first section 22*f* extends from the meeting point 26, at which the second groove 22 meets the first groove 21, toward one side of the cushion member 4P in the front-rear direction of the seat cushion 4, at which the seatback 6 is arranged. Because part of the upholstery member 4S is fixed to the cushion member 4P at the first section 22*f* (a section that is subjected to pressure from the seated occupant) near the seatback 6, the upholstery member 4S is attached to the cushion member 4P more stably. According to the present embodiment, it is possible to fix the part (18b) of the upholstery member (18b) to the cushion member 4P with the presentable appearance maintained, while effectively utilizing the seat configuration.

An alternative embodiment of the invention will be described below. As the configuration of each second engaging member 42, in addition to the above-described configuration, various other configurations may be employed. In the alternative embodiment, for example, a plurality of second engaging members (a first second-engaging member 42f and a second second-engaging member 42s) is used (see FIG. 2B). Each of the first second-engaging member 42f and the second second-engaging member 42s is a wiry member, and is shorter than the first section 22f.

Figure 2B:
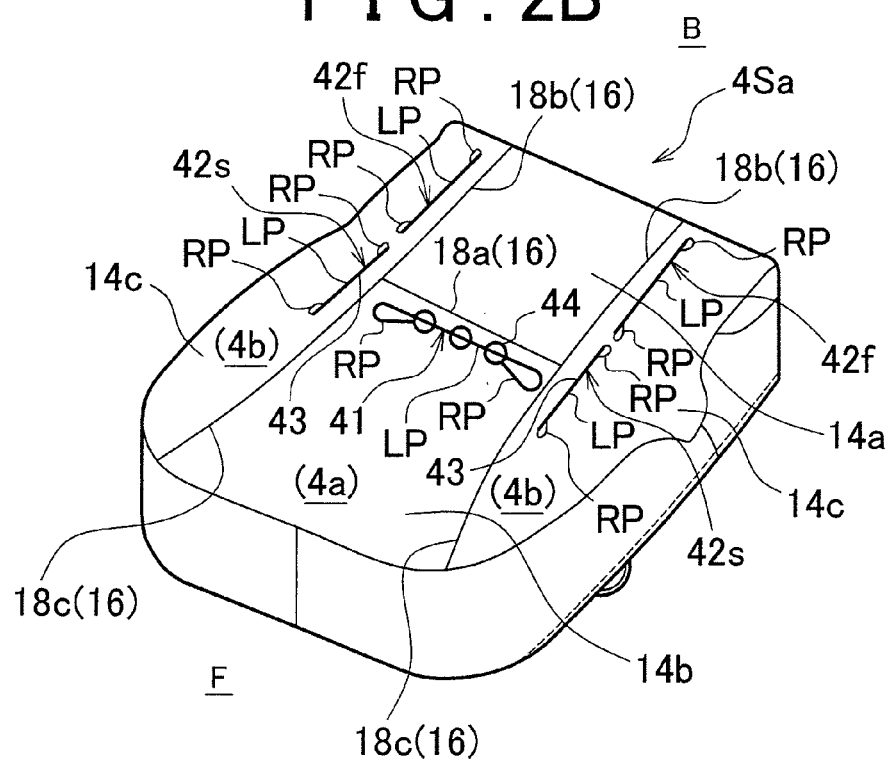
FIG. 2B is a perspective view of an upholstery member according to an alternative embodiment of the invention.

In the alternative embodiment, the first second-engaging member 42f and the second second-engaging member 42s are arranged side-by-side in the front-rear direction of the seat cushion 4, attached to the second sewn portion 18b, and arranged to face the second groove 22 (see FIGS. 2B and 3). At this time, the first second-engaging member 42f is arranged in the first section 22f, and one end-side portion of the second second-engaging member 42s is extended into the second section 22s (the extended portion 43 is formed). In addition, in the direction in which the second groove 22 extends, the length of the extended portion 43 is set shorter than the length of the remaining portion of the second section 22s, that is, a portion of the second section 22s excluding the other portion corresponding to the extended portion 43. Furthermore, the one end-side portion of the second second-engaging member 42s (the portion which crosses the meeting point 26) is engaged with the second engaged member 46 in addition to the remaining portion of the second second-engaging member 42s (the portion that faces the first section 22f). Therefore, in the alternative embodiment as well, the portion of the upholstery member 4S, which faces the meeting point 26, is tucked into and fixed in the second groove 22.

The vehicle seat 2 according to the invention is not limited to the above-described embodiments, and may be implemented in various other embodiments. (1) In the above-described embodiments, the section that extends from the meeting point 26, at which the second groove 22 meets the first groove 21, toward the rear (one side) of the cushion member 4P is used as the first section 22f. Alternatively, the section that extends from the meeting point toward the front (the other side) of the cushion member may be used as the first section. (2) In the above-described embodiments, a pair of the grooves 22 is formed in the cushion member 4P. Alternatively, a single second groove or three or more second grooves may be formed in a cushion member. The multiple grooves may be formed so as to be parallel to each other or so as not to be in parallel to each other. In addition, each second groove may be connected to the first groove at right angle or connected to the first groove so as to be inclined with respect to the first groove. (3) In the above-described embodiments, the single first groove 21 is formed in the cushion member 4P. Alternatively, a plurality of first grooves may be formed in the cushion member. (4) In the above-described embodiments, an example of the configuration of the recessed portions 24 is presented. However, the configuration of the recessed portions (the positions of the recessed portions and the number of the recessed portions) is not limited to this example. The number of the recessed portions may be one, or two or more. (5) In the above-described embodiments, the engaging member 41 and the engaging members 42 are attached to the sewn portion 18a and the sewn portions 18b, respectively, via the sheet members 16 (indirectly). Alternatively, the engaging members may be directly attached to the sewn portions without using the sheet members. (6) In the above-described embodiments, the engaging members 41, 42 are wiry members. However, the configuration of an engaging member is not limited to this. For example, as an engaging member, there may be employed a structure (suspender structure) in which cutouts are formed near the edge of the sewn portion, and a (linear) resin member is fixed to the end of the sewn portion. The ring members are passed through the engaging member (cutouts), the resin member and the engaged member are passed through the ring members, and then the ring members are clamped into a closed ring shape.

(7) In the above-described embodiments, the invention is applied to the seat cushion 4. However, the configuration according to the above-described embodiments may be applied to various seat components such as a seatback. When the seat component to which the invention is applied is a seatback, it is desirable that a first section extends from a meeting point, at which a second groove meets a first groove, toward one side of a cushion member, at which a seat cushion is arranged. Because a portion of an upholstery member is fixed to the cushion member at the first section (the section that is subjected to pressure from the seated occupant) near the seat cushion, the upholstery member is attached to the cushion member more stably.

What is claimed is:
1. A vehicle seat, comprising,
a seat component that includes:
a cushion member that forms an outer shape of the seat component, and that elastically supports an occupant;
a first groove that is provided in a seating-side portion of the cushion member, and that extends in a width direction of the seat component;
a second groove that is provided in the seating-side portion of the cushion member, and that meets the first groove at a meeting point, the second groove having a first section and a second section;
an upholstery member that covers the cushion member; and
an engaging member, wherein
at least a portion of part of the upholstery member is tucked into and fixed in the first groove and the second groove,
the first section of the second groove extends from the meeting point, at which the second groove meets the first groove, toward one side of the cushion member and the second section of the second groove extends from the meeting point toward the other side of the cushion member,
the engaging member is arranged at a first portion and a second portion of the part of the upholstery member, the first portion facing the first section and the second portion facing the second section,
the engaging member is fixed to an engaged member arranged in the second groove,
one end-side portion of the engaging member provided in the first section of the second groove extends into the second section of the second groove and includes an extended portion having a length that extends from the meeting point, at which the second groove meets the first groove, into the second section, and
the length of the extended portion is shorter than a length of a remaining portion of the second section of the second groove excluding the extended portion of the one end-side portion of the engaging member.

2. The vehicle seat according to claim 1, wherein
the seat component is a seat cushion,
a seatback is arranged at a rear of the seat cushion, and
the first section of the second groove extends from the meeting point toward the one side of the cushion member, at which the seatback is arranged.

3. The vehicle seat according to claim 1, wherein
the seat component is a seatback, and
the first section of the second groove extends from the meeting point toward the one side of the cushion member, which is a lower side of the seatback when the seatback is raised.

4. The vehicle seat according to claim 1, wherein
the engaging member is a wire member, and has a linear engaging portion and a turn-back portion that is a bent portion at an end portion of the engaging member.

5. The vehicle seat according to claim 4, wherein
the engaging member is arranged such that the engaging portion crosses the meeting point.

6. The vehicle seat according to claim 4, wherein
the engaged member arranged in the second groove is a rod-shaped member, and
the engaging member and the engaged member are engaged with each other via a ring member.

7. The vehicle seat according to claim 6, wherein
a plurality of recessed portions are provided in a bottom face of the second groove and extend in the direction from the one side of the cushion member toward the other side of the cushion member,
the plurality of the recessed portions are arranged at intervals in the second groove, and
the engaged member is exposed at the recessed portions.

* * * * *